(12) United States Patent
Steiger et al.

(10) Patent No.: US 8,168,246 B2
(45) Date of Patent: May 1, 2012

(54) METHOD FOR INSTANTISATION OF COCONUT MILK POWDER

(75) Inventors: Daniel Steiger, Schenefeld (DE); Ilona Stoffels, Hamburg (DE); Ilka Knickrehm, Ellerau (DE)

(73) Assignee: Degussa Texturant Systems, Deutschland GmbH & Co. KG, Hamburg (DE)

( * ) Notice: Subject to any disclaimer, the term of this patent is extended or adjusted under 35 U.S.C. 154(b) by 1568 days.

(21) Appl. No.: 10/585,132

(22) PCT Filed: Aug. 9, 2005

(86) PCT No.: PCT/EP2005/008631
§ 371 (c)(1),
(2), (4) Date: Jun. 30, 2006

(87) PCT Pub. No.: WO2008/009297
PCT Pub. Date: Jan. 24, 2008

(65) Prior Publication Data
US 2009/0175990 A1    Jul. 9, 2009

(30) Foreign Application Priority Data
Aug. 11, 2004   (DE) .......................... 10 2004 038 910

(51) Int. Cl.
*A23L 1/00*     (2006.01)
*A23L 2/38*     (2006.01)

(52) U.S. Cl. ....................................... 426/305; 426/590
(58) Field of Classification Search .................... 426/99, 426/187, 189, 216, 358, 302, 456, 584, 305, 426/590
See application file for complete search history.

(56) References Cited

U.S. PATENT DOCUMENTS

| | | | | |
|---|---|---|---|---|
| 2,400,834 A | * | 5/1946 | Le Gloahec | 536/3 |
| 4,289,788 A | * | 9/1981 | Cajigas | 426/61 |
| 4,318,932 A | * | 3/1982 | Ewing et al. | 426/285 |

FOREIGN PATENT DOCUMENTS

| | | | |
|---|---|---|---|
| GB | 2035035 | * | 6/1980 |
| GB | 2035036 | | 6/1980 |

OTHER PUBLICATIONS

What is Coconut Milk, http://www.wisegeek.com/what-is-coconut-milk.htm, Nov. 2010.*
FR2398525 Machine Translation Apr. 29, 2011.*

* cited by examiner

*Primary Examiner* — Kelly Bekker
*Assistant Examiner* — Lela S Williams
(74) *Attorney, Agent, or Firm* — Merek, Blackmon & Voorhees, LLC

(57) ABSTRACT

The invention relates to a method for the instantization of powders for use in the food stuff and animal feed production, the particles of which comprise free surface fat, especially coconut milk powder, wherein lecithin and alginate in water or an aqueous liquid are sprayed onto the powder particles and are subsequently dried.

4 Claims, No Drawings

METHOD FOR INSTANTISATION OF COCONUT MILK POWDER

CROSS-REFERENCE TO RELATED APPLICATION

The present application claims the priority under 35 U.S.C. 119 of German Application No. 10 2004 039 910.1, filed Aug. 11, 2004, which is hereby incorporated herein by reference in its entirety.

The invention relates to a method for the instantisation of powders, the particles of which comprise free surface fat (FOF).

The invention relates to a method fox the instantisation of powders for use in the food stuff and animal feed production, the particles of which comprise free surface fat, especially of coconut milk powder.

It is known to use an emulsifying agent, for example lecithin in the instantisation. The term lecithin means a complex mixture of a plurality of components, mainly phospholipides, glycolipides, carbohydrates and in some cases triglycerides, wherein the phospholipides as phosphorus containing polar lipids form the active components of the lecithins, and that in technological as well as physiological regard. These complex mixtures are allowed as foodstuff additives in Europe as well as in the United States and con therefore be used as emulsifying agent for food stuff.

The differences in the lecithins, which are of importance in connection with the present invention, can be related back to the proportionate composition of the phospholipides. These are the contents of phosphatidyl choline, phosphatidyl ethanolamine, phosphatidic acid, phosphatidyl inositol and also of their corresponding lyso-compounds.

Alginates are salts and esters of the alginic acid and can be isolated from algae (marine brown algae). However, it is also possible to produce alginates from bacteria, such as *Azotobakter vinelandii* and *Azotobakter crococum* and different other *Pseudomonas*.

They are used in food stuffs due to their special properties in the gelatinization, as thickening agent, as stabilizer and also due to the possibility to adjust the viscosity of liquids with them. The alginates used as thickening agents are sodium, ammonium and potassium salts of the alginic acid.

The use of alginates in the instantisation has not been described, which can be referred back to the feet that by the addition of alginates to fluids the latter are thickened and assume very high viscosity already when adding low amounts, which counteracts the instantisation.

The present invention relates to a method to improve the instantisation process, and that especially with regard to good wettability with water or aqueous liquids, respectively, i.e. a wettability within shortest time.

This is achieved by a
method for the instantisation of powders for use in the food stuff and animal feed production, the particles of which comprise free surface fat, especially of coconut milk powder, wherein lecithin and alginate in water or an aqueous liquid are sprayed onto the powder particles and are subsequently dried, and a
method for the instantisation of powders for use in the food stuff and animal feed production, the particles of which comprise free surface fat especially of coconut milk powder, wherein lecithin and alginate in water or in an aqueous liquid are sprayed onto the powder particles, the powder particles agglomerate and are subsequently dried, and a
method for the instantisation of powders for use in the food stuff and animal feed production, the particles of which comprise free surface fat, especially of coconut milk powder, wherein alginate in water or in an aqueous liquid is sprayed onto the powder particles, the powder particles agglomerate if appropriate and are dried, and wherein lecithin is dispersed in water or an aqueous liquid and is sprayed onto the powder particles and these are subsequently dried. Or wherein lecithin in liquid form or diluted in oil/fat or dissolved in oil/fat is sprayed onto the powder particles.

For the agglomeration, the selected alginate is dissolved in water and sprayed onto the powder particles, which agglomerate then and are subsequently dried.

The reason for the use of alginates is here the treatment of the surface of the powder particles, that is in the formation of a layer (coating) on the free surface fat layer of these particles.

From the group of the alginates, the sodium salts of the alginic acid are preferred for the present invention and especially those alginates are used, which comprise a higher content of mannuronic acid as compared to guluronic acid. Furthermore, such alginates are preferred, which have a small molecular size such that this has a viscosity of less than 500 mPas in a 4 percent by weight solution in water.

For the agglomeration process, an alginate XPV MC 25 was successfully used, for example, which has a viscosity of 20 mPas in a 4 percent by weight solution.

In the single step of an instantisation method according to the invention, the lecithin is dissolved in fat of oil (preferably coconut fat or soybean oil) for the lecithination step, and this mixture is sprayed onto the fluidized coconut milk particles.

Selected from the large group of the lecithins, such lecithins and lecithin products having an acetone-insoluble content between 30 percent by weight to 99.9 percent by weight, and especially preferred with a content larger than 97 percent by weight are preferably chosen for the invention.

A lecithin having the following composition, for example, is used for the invention, wherein the content of phosphatidyl choline (PC) summed up with the content of lysophosphatidyl choline (LPC), calculated on the acetone-insoluble content, is composed as follows:
12-95% (PC+LPC), preferably 16-64% (PC+LPC) and most preferred 20-33% (PC+LPC), each calculated on the acetone-insoluble content and indicated in percent by weight.

In connection with, the lecithination step, commercially available lecithins can be used, such as Metarin P, Metarin CP, Emultop, Emultop HL50, Emulfluid HL33, and that each dissolved in coconut fat and Metarin P dissolved in soy bean oil. The dosage ranges from 0.4 to 1.0% of the acetone-insoluble content of the powder.

The advantages achieved in tests according to the invention are the better wettability, a better behaviour regarding sinking down in the liquid and finally the improved dispersing behaviour free from lumps.

In comparative tests with only one method step, that is either of the lecithination or the agglomeration or the coating with alginate, respectively, it was found out that each method by itself only had a limited positive influence on the instant behaviour. By merging both methods to one single method step according to the invention, surprisingly, positive influences on the wettability, the flowing properties and the dispersibility ware obtained.

Powders with fat content, which are sprayed with lecithin in order to obtain an improved instant behaviour, lose their good wettability properties in the course of the storage period. This effect is caused in that the phospholipides (PL) of the lecithin—especially the more non-polar PL (for example phosphatidyl ethanolamin—PE) migrate under the surface ("powder surface" or interface between air and fat, respectively) of the free surface fat (FOF) of the powder, these PL are not available on the surface any more or the only very few more polar PL (for example phosphatidyl choline—PC) are not sufficient on the surface any more, respectively, and the wettability behaviour $\lambda$ or instant behaviour, respectively, significantly deteriorates in the course of time. This applies especially with increasing contents of FOF, which usually increase with raising fat contents in the powder product and/or extended storage periods.

Well known is the use of PL fractions with raised contents of polar PL. These rather remain at the surface (interface air/fat) of such powders and a deterioration of the instant behaviour/wettability can be substantially delayed in the course of the storage period.

The attempt to instantize a coconut milk or cream powder or such like is further impeded by the fact that the powder has a very high total fat content and thus a high content of FOF.

A slight improvement could be achieved by a suitable lecithin quality. However, after a few days the original wettability behaviour appeared again.

Therefore, a possibly complete compensation of the negative properties of the fat surface of coconut milk powders was aimed for by means of coating with hydrocolloids, for example. The difficulty in this was the selection of a suitable polysaccharide. A very good sprayability had to be assured (low viscosity), a possibly closed surface was intended to be achieved and the used amounts had to be not too large (which would result is a substantial shift of the powder composition).

At the same time it was important that the rheological properties after a constitution of the powder in water, for example, correspond to the viscosity to be expected of a coconut milk, for example. The use of a polysaccharide was not allowed to negatively affect the texture/viscosity.

The viscosity of a hydrocolloid water suspension is usually adjusted by a suitable added amount of hydrocolloid. In order to obtain a low viscosity of the spraying suspension with hydrocolloids such as alginates, the added amount would have to be correspondingly small such that a complete coating of the powder surface would take comparatively long (low spraying rate and long subsequent drying times). At the same time, substantially larger amounts are to be applied due to the molecule size in order to obtain a closed coating. Furthermore, the reconstructed end product would comprise an untypical texture.

All conditions for the suitability of a hydrocolloid resulted in the use of a newly developed alginate, which does not cause a substantial increase of viscosity in water also when used in a larger added amount. By its small molecule size (little steric hindrance), a very closely packed and thin coating can be applied onto the powder surface and thus a substantially smaller amount can be used. But also using this special alginate, only a slight improvement of the instant behaviour could be achieved. The effort was in a bad proportion to me result.

The product was now additionally subjected to lecithination.

Slightly improved properties were observed. Bur also in this case the result could not justify the large effort.

Now a still further variant was tried. In this, an alginate lecithin coating was produced in one single step. Completely surprising, and not as expected, excellent results could be obtained now. These results lead to assume that by the use of both ingredients in one step a complex is formed on the FOF surface, which imparts the powder the property of an excellent instant product, and maintains this effect also over a longer storage period.

The substantial feature of the invention is the simultaneous use of lecithin and alginate, which leads to results, which were foreseeable neither for the use of lecithin by itself nor of alginate by itself.

EXAMPLE 1

Materials

Coconut milk powder (Pulau Sambu), fat content 50%
Alginate XPV MC 25 (Degussa Food Ingredients).
Method:

200 g coconut milk powder are provided in a "bottom spray" container of a fluid bed (for example Aeromatic STREA-1) working on a batch basis. The incoming air flow amounts to 30 $m^3$/h at 40° C. 20 g of a 5% spraying suspension of XPV MC 25 in water are sprayed onto the powder by means of a two-fluid nozzle (Ø 0.5 mm, pressurised air 1.5 bar). Thereafter, the water is dried out again with an incoming air stream of 30 $m^3$/h and at a temperature of 40° C. for 15 min. The powder is covered with an alginate coating thereby.

For the evaluation of wettability, 20 g of the treated powder are given onto the surface of 200 ml water with a temperature of 25° C. (beaker 400 ml). Simultaneously, the time is measured, until complete wetting of the powder with water occurs. After 20 s a photograph of the test preparation is taken.

For the evaluation of the dispersing behaviour the procedure as described above is used, however, the powder is mixed in directly after contact of the powder with the water under the same conditions (magnetic stirrer, 20 s). Thereafter, the dispersion is described according to the observed distribution of the powder.
Result The powder is completely wetted with water within 50 s.

After 20 s, about 40% of not wetted powder can still be observed at the water surface.

The powder can be dispersed into the water homogeneously and free of lumps.

EXAMPLE 2

As in example 1, but with altered composition of the spraying suspension.
Materials:
Coconut milk powder (Pulau Sambu), fat content 50%
Metarin P (Degussa Food Ingredients)
20 g of a 5% spraying suspension of Metarin P in water are sprayed on. The powder is covered with a lecithin coating thereby.
Result:
The powder is completely wetted with water within 30 s.
After 20 s, about 10% of non-wetted powder can still be observed at the water surface.
The powder can be dispersed into the water homogeneously and free of lumps.

EXAMPLE 3

As example 1, but with altered composition, of (the spraying suspension.
Materials:
Coconut milk powder (Pulau Sambu), fat content 50%
Metarin P (Degussa Food Ingredients)
Alginate XPV MC 25 (Degussa Food Ingredients)

20 g of a 10% spraying suspension consisting of a mixture of XPV MC 25 and Metarin each used in equal parts in water are sprayed on. The powder is covered with an alginate lecithin coating thereby.

Result

The powder is completely wetted with water within 10 s.

After 20 s no non-wetted powder is to be observed at the water surface.

The powder can be dispersed into the water homogeneously and free of lumps.

Remark

In order to work out, to which extent the content of water in the spraying suspension (examples 1-3) influences the instant behaviour of the powder (wetting of the powder surface by water, for example, can cause an agglomeration—agglomerates typically comprise a better instant behaviour), a powder was prepared as described in example 1, onto which only water was sprayed. The resulting powder did not show any wetting behaviour. This implies that all the powder remains dry on the water surface.

EXAMPLE 4

Materials

Spray cream powder (Subicream 72), fat content 72%
Alginate XPV MC 25 (Degussa Food Ingredients)
Metarin CP (Degussa Food Ingredients)

Method 500 g powder are provided in a "bottom spray" container of a fluid bed (for example Heinen Mobatch) working on a batch basis. The incoming air flow amounts to 35 m$^3$/h at 55° C. 50 g of a 10% spraying suspension of a mixture existing of XPV MC 25 and Metarin CP in equal parts in water are sprayed onto the powder by means of a two-fluid nozzle (Ø 0.8 mm, pressurised air 1.5 bar). The spraying rate is 8 ml/min. Thereafter, the water is dried out again with an incoming air stream of 30 m$^3$/h and at a temperature of 60° C. for 15 min. The powder is covered with an alginate lecithin coating thereby.

For die evaluation of wettability, 20 g of the treated powder are given onto the surface of 200 ml water with a temperature of 25° C. (beaker 400 ml). Simultaneously the time is measured, until the complete wetting of the powder with water occurs.

For the evaluation of the dispersing behaviour, the procedure as described above is used, however, the powder is mixed in directly after contact of the powder with the water under the same conditions (magnetic stirrer, 20 s). Thereafter, the dispersion is described according to the observed distribution of the powder.

Result

The powder is completely wetted with water within 45 s.

The powder can be dispersed into the water homogeneously and free of lumps.

Remarks

The use of devices working on a batch basis, as described in these examples, does not exclude the use of continuous processes.

In order to confirm that the use of a comparatively low-viscosity alginate (XPV MC 25) is required, the tests were performed with a different alginate, Satialgine S20. Satialgine S20 is a commercially available alginate from the product program of the Degussa Food Ingredients, which comprises the lowest viscosity in water.

However, already the preparation of a 10% aqueous spraying suspension of a mixture of Satialgine S 20 and Metarin P in equal parts proved to be difficult. Due to the characteristic high viscosity, a homogenous dispersion free of lumps could be prepared only with difficulty.

Also the metering of the spraying dispersion (the pumping to the nozzle) proved to be difficult.

Above that a highly viscous coat formed on the water surface during the wetting of the powder in water, which can hardly be stirred into the water homogeneously.

Metarin is a trademark of the applicant and stands for deoiled lecithin (Metarin P) and PC enriched deoiled lecithin (Metarin CP).

The invention claimed is:

1. A method for the instantisation of powders for use in food stuff and animal feed production, wherein the method comprises spraying a mixture of lecithin and alginate in water or in an aqueous liquid onto powder particles which comprise free surface fat and subsequently drying said sprayed power particles.

2. A method for the instantisation of powders for use in food stuff and animal feed production, wherein the method comprises spraying a mixture of lecithin and alginate in water or in an aqueous liquid onto powder particles, which comprise free surface fat the powder particles agglomerate and subsequently drying said sprayed power particles.

3. The method of claim 1, wherein the free surface fat is that of coconut milk powder.

4. The method of claim 2, wherein the free surface fat is that of coconut milk powder.

* * * * *